United States Patent
Hamano

(10) Patent No.: US 8,854,533 B2
(45) Date of Patent: Oct. 7, 2014

(54) IMAGE CAPTURE APPARATUS AND CONTROL METHOD THEREFOR

(71) Applicant: Canon Kabushiki Kaisha, Tokyo (JP)

(72) Inventor: Hideyuki Hamano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 5 days.

(21) Appl. No.: 13/857,535

(22) Filed: Apr. 5, 2013

(65) Prior Publication Data

US 2013/0271646 A1      Oct. 17, 2013

(30) Foreign Application Priority Data

Apr. 11, 2012   (JP) .................................. 2012-090453

(51) Int. Cl.
| | |
|---|---|
| H04N 5/232 | (2006.01) |
| G03B 13/00 | (2006.01) |
| G02B 7/34 | (2006.01) |
| G03B 13/36 | (2006.01) |
| H04N 5/369 | (2011.01) |
| H04N 9/04 | (2006.01) |

(52) U.S. Cl.
CPC ...... *G03B 13/36* (2013.01); *G02B 7/34* (2013.01); *H04N 9/045* (2013.01); *H04N 5/23212* (2013.01); *H04N 5/23209* (2013.01); *H04N 5/3696* (2013.01)
USPC ........................................................ 348/350

(58) Field of Classification Search
USPC ........................................................ 348/350
See application file for complete search history.

(56) References Cited

U.S. PATENT DOCUMENTS

| 8,319,882 | B2* | 11/2012 | Fujii et al. | 348/345 |
|---|---|---|---|---|
| 2010/0045849 | A1* | 2/2010 | Yamasaki | 348/349 |
| 2012/0033128 | A1* | 2/2012 | Nagano | 348/349 |
| 2012/0147227 | A1* | 6/2012 | Yoshimura et al. | 348/246 |
| 2012/0268613 | A1* | 10/2012 | Nishio | 348/208.5 |

FOREIGN PATENT DOCUMENTS

| JP | 2007-004471 A | 1/2007 |
|---|---|---|
| JP | 2010-113162 A | 5/2010 |
| JP | 2011-125055 A | 6/2011 |

* cited by examiner

*Primary Examiner* — Albert Cutler
(74) *Attorney, Agent, or Firm* — Cowan, Liebowitz & Latman, P.C.

(57) ABSTRACT

An image capture apparatus comprises an image sensor including at least three focus detecting pixels, an optical axis displacement unit which displaces an optical axis of an imaging optical system by driving at least part of the imaging optical system, and a focus adjustment unit which performs focus adjustment by a phase-difference detection method using a pair of images detected in the at least three focus detecting pixels, wherein if the optical axis displacement unit moves the at least part of the imaging optical system, the focus adjustment unit performs focus adjustment using detection results of a pair of focus detecting pixels, among the at least three focus detecting pixels, other than a focus detecting pixel in which a common part of an exit pupil area and the light-receiving area of the focus detecting pixel is smallest.

20 Claims, 12 Drawing Sheets

IMAGE CAPTURE APPARATUS AND CONTROL METHOD THEREFOR

BACKGROUND OF THE INVENTION

1. Field of the Invention

The present invention relates to an image capture apparatus which enables high-speed focus detection irrespective of the position of the exit pupil of a photographing lens.

2. Description of the Related Art

As a general camera focus detection/adjustment method of using light beams having passed through a photographing lens, there are a contrast detection method and phase-difference detection method. As compared with the phase-difference detection method, it is generally difficult to increase the processing speed with the contrast detection method as an evaluation value is obtained while moving the focus position of the photographing lens by an infinitesimal amount, and a focus position with a maximum evaluation value is determined as an in-focus position. On the other hand, since the phase-difference detection method performs focus detection using two light beams having passed through different areas of the exit pupil of the photographing lens, it can detect a focus point without moving the focus position, thereby allowing high-speed processing. In the phase-difference detection method, however, if the symmetry of the two light beams is disturbed, the accuracy of focus detection significantly decreases.

For example, Japanese Patent Laid-Open No. 2010-113162 discloses an apparatus of performing focus detection by the phase-difference detection method using a two-dimensional sensor in which a microlens is formed in each pixel of an image sensor which receives a light beam having passed through a photographing lens. In Japanese Patent Laid-Open No. 2010-113162, manufacturing errors of the optical photoelectric conversion unit and microlens of the image sensor are considered as factors in disturbing the symmetry of two light beams used for phase-difference detection. The manufacturing errors increase the degree of vignetting by the lens frame of the photographing lens especially at the periphery of a frame, thereby increasing a difference in amount of light between the two light beams. In this example, a manufacturing error of the image sensor shifts, on the exit pupil of the photographing lens, the position of a light beam used for focus detection, thereby decreasing the accuracy of focus detection.

On the other hand, the accuracy of focus detection may also decrease when the position of the exit pupil of the photographing lens moves. Examples of a photographing lens for which the position of the exit pupil moves are a photographing lens including an optical system which can be shifted or tilted with respect to an imaging plane, and a photographing lens including an optical system part of which can be shifted for the anti-vibration purpose. To prevent a decrease in focus detection accuracy when the position of the exit pupil of such a photographing lens moves, Japanese Patent Laid-Open No. 2011-125055 proposes a technique of switching between the phase-difference detection method and the contrast detection method according to the shift or tilt amount of the photographing lens, and using it.

In the above-described technique disclosed in Japanese Patent Laid-Open No. 2011-125055, however, if the movement amount of the position of the exit pupil of the photographing lens is large, focus adjustment is performed by the contrast detection method, thereby disabling high-speed focus adjustment.

SUMMARY OF THE INVENTION

The present invention has been made in consideration of the above-described problems, and provides an image capture apparatus which enables high-speed focus detection irrespective of the position of the exit pupil of a photographing lens.

According to the first aspect of the present invention, there is provided an image capture apparatus comprising: an image sensor including at least three focus detecting pixels wherein the at least three focusing detecting pixels respectively have light-receiving areas at different positions; an optical axis displacement unit which displaces an optical axis of an imaging optical system by driving, in a direction different from the optical axis, at least part of the imaging optical system for forming an object image on the image sensor; and a focus adjustment unit which performs focus adjustment by a phase-difference detection method using a pair of images detected in the at least three focus detecting pixels, wherein if the optical axis displacement unit moves the at least part of the imaging optical system in a direction different from the optical axis, the focus adjustment unit performs focus adjustment using detection results of a pair of focus detecting pixels, among the at least three focus detecting pixels, other than a focus detecting pixel in which a common part of an exit pupil area of the imaging optical system and the light-receiving area of the focus detecting pixel projected on an exit pupil of the imaging optical system is smallest.

According to the second aspect of the present invention, an image capture apparatus comprising: an image sensor including at least three focus detecting pixels wherein the at least three focusing detecting pixels respectively have light-receiving areas at different positions; an optical axis displacement unit which displaces an optical axis of an imaging optical system by driving, in a direction different from the optical axis, at least part of the imaging optical system for forming an object image on the image sensor; and a focus adjustment unit which performs focus adjustment by a phase-difference detection method using a pair of images detected in the at least three focus detecting pixels, wherein the focus adjustment unit switches a pair of focus detecting pixels, among the at least three focus detecting pixels, to be used for the focus adjustment in accordance with a movement amount of the at least part of the imaging optical system in a direction different from the optical axis by the optical axis displacement unit.

According to the third aspect of the present invention, an image capture apparatus comprising: an image sensor including an image capture pixel having at least three photoelectric conversion units; an optical axis displacement unit which displaces an optical axis of an imaging optical system by driving, in a direction different from the optical axis, at least part of the imaging optical system for forming an object image on the image sensor; and a focus adjustment unit which performs focus adjustment by a phase-difference detection method using a pair of images detected in the at least three photoelectric conversion units, wherein if the optical axis displacement unit moves the at least part of the imaging optical system in a direction different from the optical axis, the focus adjustment unit performs focus adjustment using detection results of a pair of photoelectric conversion units, among the at least three photoelectric conversion units, other than a photoelectric conversion unit in which a common part of an exit pupil area of the imaging optical system and the light-receiving area of the photoelectric conversion unit projected on an exit pupil of the imaging optical system is smallest.

According to the fourth aspect of the present invention, an image capture apparatus comprising: an image sensor including an imaging pixel having at least three photoelectric conversion units; an optical axis displacement unit which displaces an optical axis of an imaging optical system by driving, in a direction different from the optical axis, at least part of the imaging optical system for forming an object image on the image sensor; and a focus adjustment unit which performs focus adjustment by a phase-difference detection method using a pair of images detected in the at least three photoelectric conversion units, wherein the focus adjustment unit switches a pair of photoelectric conversion units, among the at least three photoelectric conversion units, to be used for the focus adjustment in accordance with a movement amount of the at least part of the imaging optical system in a direction different from the optical axis by the optical axis displacement unit.

According to the fifth aspect of the present invention, a method of controlling an image capture apparatus which comprises an image sensor including at least three focus detecting pixels wherein the at least three focus detecting pixels respectively have light-receiving areas at different positions, the method comprising the steps of: displacing an optical axis of an imaging optical system by driving, in a direction different from the optical axis, at least part of the imaging optical system for forming an object image on the image sensor; and performing focus adjustment by a phase-difference detection method using a pair of images detected in the at least three focus detecting pixels, wherein if the at least part of the imaging optical system is moved in a direction different from the optical axis in the step of displacing, focus adjustment is performed using detection results of a pair of focus detecting pixels, among the at least three focus detecting pixels, other than a focus detecting pixel in which a common part of an exit pupil area of the imaging optical system and the light-receiving area of the focus detecting pixel projected on an exit pupil of the imaging optical system is smallest in the step of performing.

According to the sixth aspect of the present invention, a method of controlling an image capture apparatus which comprises an image sensor including at least three focus detecting pixels wherein the at least three focus detecting pixels respectively have light-receiving areas at different positions, the method comprising the steps of: displacing an optical axis of an imaging optical system by driving, in a direction different from the optical axis, at least part of the imaging optical system for forming an object image on the image sensor; and performing focus adjustment by a phase-difference detection method using a pair of images detected in the at least three focus detecting pixels, wherein a pair of focus detecting pixels, among the at least three focus detecting pixels, to be used for the focus adjustment is switched in the step of performing in accordance with a movement amount of the at least part of the imaging optical system in a direction different from the optical axis in the step of displacing.

Further features of the present invention will become apparent from the following description of exemplary embodiments with reference to the attached drawings.

DESCRIPTION OF THE EMBODIMENTS

A lens-interchangeable single-lens reflex digital camera as an embodiment of an image capture apparatus according to the present invention will be described in detail with reference to the accompanying drawings.

Figure 1:
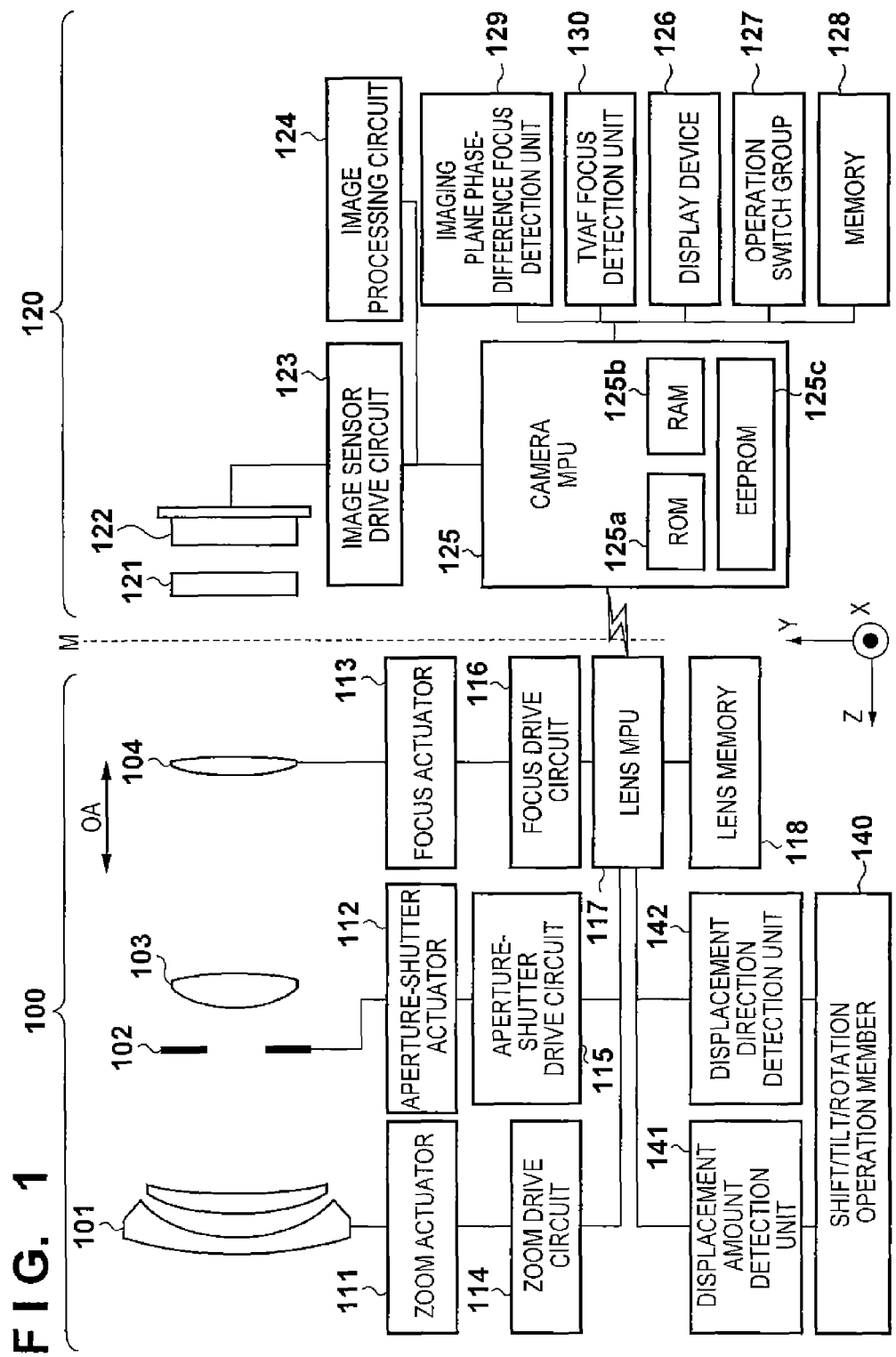
FIG. 1 is a block diagram showing a digital camera according to an embodiment of the present invention.

FIG. 1 is a block diagram showing a digital camera according to the embodiment. The digital camera of the embodiment is a lens-interchangeable single-lens reflex camera, and includes a lens unit 100 and a camera main body 120. The lens unit 100 is connected with the camera main body 120 via a mount M indicated by a dotted line in the middle of FIG. 1.

The lens unit 100 includes a first lens group 101, an aperture-shutter 102, a second lens group 103, a focus lens group (to be simply referred to as a "focus lens" hereinafter) 104, and a drive/control system. The lens unit 100 includes the focus lens 104 as well as a photographing lens for forming an object image.

The first lens group 101 is disposed on the front end of the lens unit 100, and supported so as to be movable forward and backward along an optical axis OA. The aperture-shutter 102 adjusts the diameter of its opening, thereby adjusting the amount of light during photography and also functions as an exposure time adjustment shutter during still image photography. The aperture-shutter 102 and second lens group 103 move together forward and backward along the optical axis OA, and, in conjunction with the movement forward and backward of the first lens group 101, provide a zoom function. The focus lens 104 performs focus adjustment by moving forward and backward along the optical axis.

The drive/control system includes a zoom actuator 111, an aperture-shutter actuator 112, a focus actuator 113, a zoom drive circuit 114, an aperture-shutter drive circuit 115, and a focus drive circuit 116. The drive/control system also includes a lens MPU 117, a lens memory 118, a shift/tilt/rotation operation member 140, a displacement amount detection unit 141, and a displacement direction detection unit 142.

The zoom actuator 111 drives the first lens group 101 and second lens group 103 forward and backward along the optical axis OA to perform a zoom operation. The aperture-shutter actuator 112 controls the diameter of the opening of the aperture-shutter 102 to adjust the amount of light for photography, and also controls the exposure time during still image photography.

The focus actuator 113 drives the focus lens 104 forward and backward along the optical axis OA to perform focus adjustment. The focus actuator 113 has the function of a position detection unit for detecting the current position of the focus lens 104.

The zoom drive circuit 114 drives the zoom actuator 111 according to a zoom operation by the user. The aperture-shutter drive circuit 115 controls the drive of the aperture-shutter actuator 112, thereby controlling the opening of the aperture-shutter 102. The focus drive circuit 116 controls the drive of the focus actuator 113 based on a focus detection result, and drives the focus lens 104 forward and backward along the optical axis OA, thereby performing focus adjustment.

The shift/tilt/rotation operation member 140 is an operation member for manually performing, with respect to the mount M of the lens unit 100, a single-axis shift within a plane to which the optical axis OA is normal, rotation (tilt) about an axis perpendicular to the optical axis OA, and rotation about the optical axis OA. The operation of the shift/tilt/rotation operation member 140 shifts/tilts/rotates the entire imaging optical system of the lens unit 100. Although the rotation about the optical axis OA has no influence on the optical performance, it is done to change a shift or tilt direction. Although a shift/tilt/rotation operation is manually performed in this embodiment, the movement method is not limited to this. An actuator such as a motor may be used to perform movement. The shift/tilt/rotation operation member 140 serves as an optical axis displacement means.

The displacement amount detection unit (displacement detection means) 141 detects a displacement amount by a shift or tilt operation by the shift/tilt/rotation operation member 140. A displacement amount in the X-axis direction is detected as a shift amount, and a rotation amount about the X-axis is detected as a tilt amount. Note that the X-axis of the detected displacement amount is that of a coordinate system rotated by rotation about the optical axis OA. It is possible to identify the absolute position of the imaging optical system by also detecting a rotation angle (to be described later) about the optical axis OA. The detected displacement amount is transmitted to the lens MPU. The displacement amount detection unit 141 serves as a displacement amount detection means.

The displacement direction detection unit 142 detects a rotation amount about the optical axis OA by the shift/tilt/rotation operation member 140. As described above, the position information enables to identify a shift or tilt direction. The displacement direction information is transmitted to the lens MPU.

The lens MPU 117 performs all calculation and control operations for the photographing lens, thereby controlling the zoom drive circuit 114, aperture-shutter drive circuit 115, focus drive circuit 116, and lens memory 118. The lens MPU 117 detects the current lens position, and notifies a camera MPU 125 of lens position information in response to a request from it. The lens position information contains the position on the optical axis of the focus lens, the position on the optical axis and diameter of the exit pupil when the imaging optical system does not move, and the position on the optical axis and diameter of a lens frame that limits the light beam of the exit pupil. Based on information about a displacement amount and a displacement direction by a shift or tilt operation which are obtained from the displacement amount detection unit 141 and displacement direction detection unit 142, the lens MPU calculates the position of the exit pupil of the imaging optical system in a direction along the optical axis and movement amount information within a plane perpendicular to the optical axis. The lens MPU notifies the camera MPU 125 of the exit pupil information in response to a request from it. The lens memory 118 stores optical information necessary for automatic focus adjustment.

The camera main body 120 includes a low-pass optical filter 121, an image sensor 122 capable of converting an object image into an electrical signal, and a drive/control system. The low-pass optical filter 121 and image sensor 122 function as an imaging optical system for forming an object image by a light beam from the lens unit 100. The first lens group 101, aperture-shutter 102, second lens group 103, focus lens group (to be simply referred to as the "focus lens" hereinafter) 104, and low-pass optical filter 121 serve as an imaging optical system.

The low-pass optical filter 121 reduces false color and moiré of a photographed image. The image sensor 122 is composed of a CMOS image sensor and the peripheral circuitry. One photoelectric conversion element is disposed in light-receiving pixels including m (horizontal)×n (vertical) pixels. The image sensor 122 is disposed so that all the pixels can independently output data. Some of the pixels serve as focus detecting pixels, thereby enabling focus detection on an imaging plane by the phase-difference detection method (imaging plane phase-difference AF processing).

More specifically, the image sensor 122 includes a plurality of imaging pixels which receive light having passed through the entire range of the exit pupil of the photographing lens for forming an object image, and generate an object image. The image sensor 122 also includes a plurality of focus detecting pixels which receive light having passed through part of the exit pupil of the photographing lens. The image sensor 122 leaves, among 2×2 pixels, a pair of G pixels diagonally arranged as imaging pixels, and replaces R and B pixels with focus detecting pixels. In this embodiment, the light-receiving area of the focus detecting pixels of the image sensor 122 is divided into at least three light-receiving areas.

The drive/control system includes an image sensor drive circuit 123, an image processing circuit 124, the camera MPU 125, a display device 126, an operation switch group 127, a memory 128, an imaging plane phase-difference focus detection unit 129, and a TVAF focus detection unit 130.

The image sensor drive circuit 123 controls the operation of the image sensor 122, and also performs A/D conversion for an obtained image signal to transmit it to the camera MPU 125. The image processing circuit 124 carries out γ conversion, color interpolation, and JPEG compression for an image obtained by the image sensor 122.

The camera MPU (processor) 125 executes all calculation and control operations for the camera main body 120, thereby controlling the image sensor drive circuit 123, image processing circuit 124, display device 126, operation switch group 127, memory 128, imaging plane phase-difference focus detection unit 129, and TVAF focus detection unit 130. The camera MPU 125 is connected with the lens MPU 117 via the signal line of the mount M, and obtains the lens position from the lens MPU 117, issues a lens drive request with a predetermined drive amount, and obtains optical information unique to the lens unit 100. The camera MPU 125 incorporates a ROM 125a storing programs for controlling the operation of the camera, a RAM 125b for storing variables, and an EEPROM 125c for storing various parameters.

The camera MPU 125 executes focus detection processing by the programs stored in the ROM 125a. In the focus detection processing, a pair of image signals obtained by photoelectrically converting optical images formed by light beams having passed through different areas of the pupil is used to execute known correlation calculation processing. In the imaging plane phase-difference AF processing, when the image height of a focus detection position is large, the influence of vignetting is large, thereby decreasing the reliability. The camera MPU 125, therefore, performs correction.

The display device 126 is composed of an LCD and the like, and displays information relating to the photographic mode of the camera, preview images before photographing, confirmation images after photographing, focus state display images during focus detection, and the like. The operation switch group 127 is composed of a power switch, a release (photography trigger) switch, a zoom operation switch, a photographic mode selection switch, and the like. The memory 128 of this embodiment is a detachable flash memory, and records photographed images.

The imaging plane phase-difference focus detection unit 129 executes focus detection processing in the AF processing by the phase-difference detection method using the image signals of the focus detecting pixels embedded in the image sensor 122. More specifically, based on a shift amount between a pair of images formed on the focus detecting pixels by light beams having passed through a pair of pupil areas of the imaging optical system, the imaging plane phase-difference focus detection unit 129 executes the imaging plane phase-difference AF processing. The method of performing the imaging plane phase-difference AF processing will be described in detail later. The imaging plane phase-difference focus detection unit 129 serves as a focus detecting means.

The TVAF focus detection unit 130 executes the focus detection processing by the contrast method using the contrast component of the image information obtained by the image processing circuit 124. The focus detection processing by the contrast method moves the focus lens 104 to detect a focus lens position where a contrast evaluation value becomes largest. As described above, in this embodiment, a combination of the imaging plane phase-difference AF processing and the TVAF processing is used, and the methods can be selectively used or used in combination according to the situation.

Figure 2:
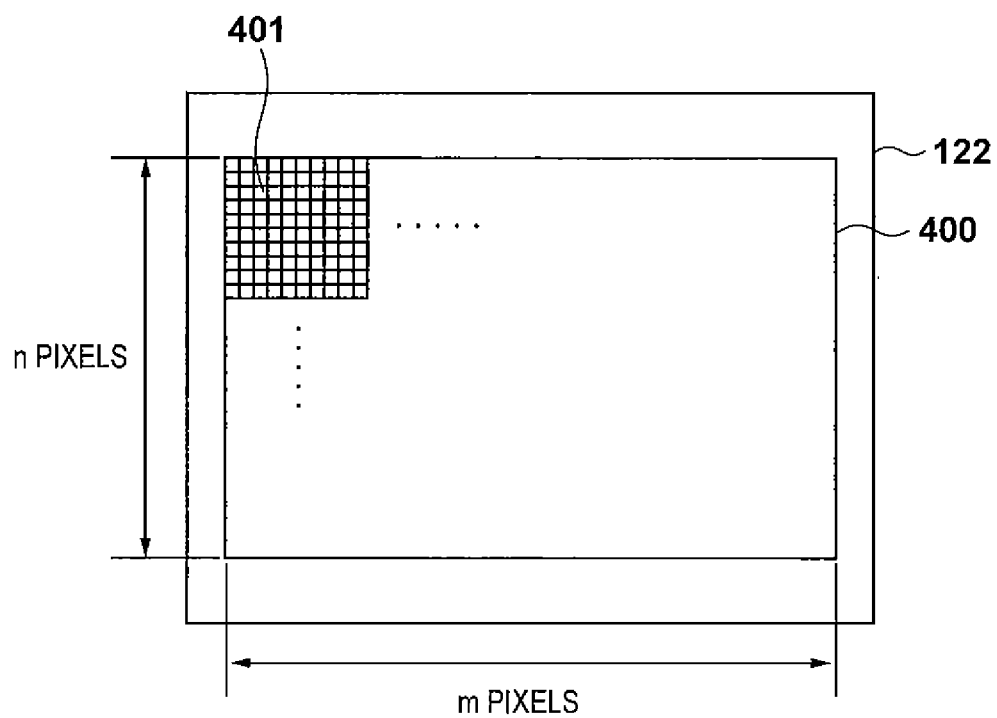
FIG. 2 is a plan view showing light-receiving pixels when viewed from the lens unit 100 side.

The focus detection unit composed of the image sensor 122 will be described in detail. FIG. 2 is a plan view showing light-receiving pixels, of the image sensor 122 shown in the block diagram of FIG. 1 showing the digital camera, on which an object image is formed, when viewed from the lens unit 100 side. Reference numeral 400 denotes an imaging range formed by all the pixels including m (horizontal)×n (vertical) pixels on the image sensor 122; 401, one pixel unit. An on-chip Bayer arrangement primary color filter is formed in each pixel unit, in which 2×2=4 pixels are repeatedly arranged. For the sake of simplicity, FIG. 2 shows only 10×10 pixels on the upper left side as pixel units, and other pixel units are omitted.

Figures 3A, 3B:
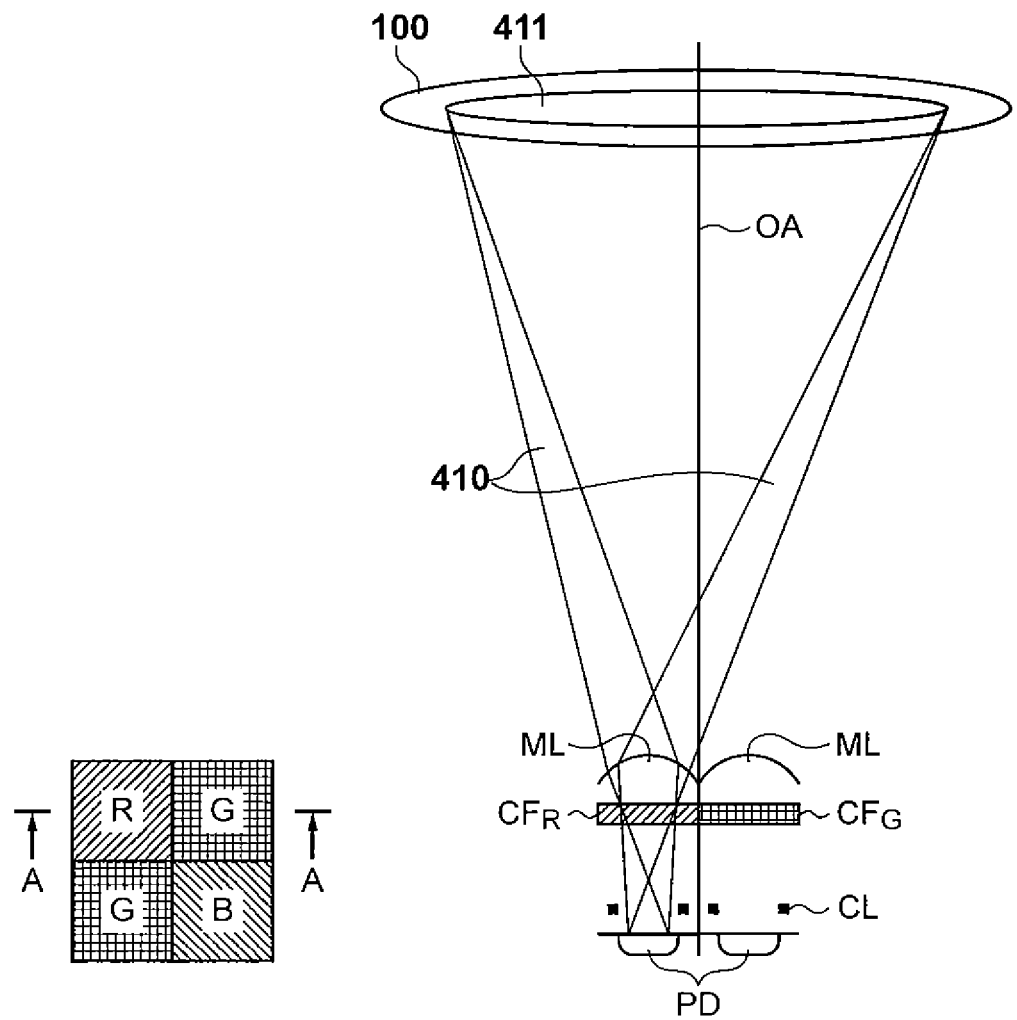
FIGS. 3A and 3B are views for explaining the structure of imaging pixels of an image sensor.
Figure 4A:
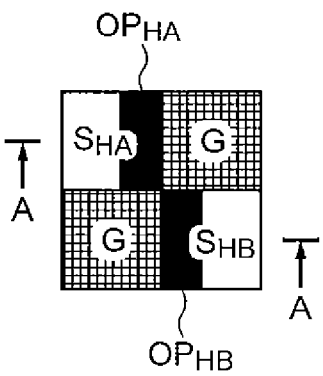
FIGS. 4A and 4B are views for explaining the structure of the focus detecting pixels of the image sensor.
Figure 4B:
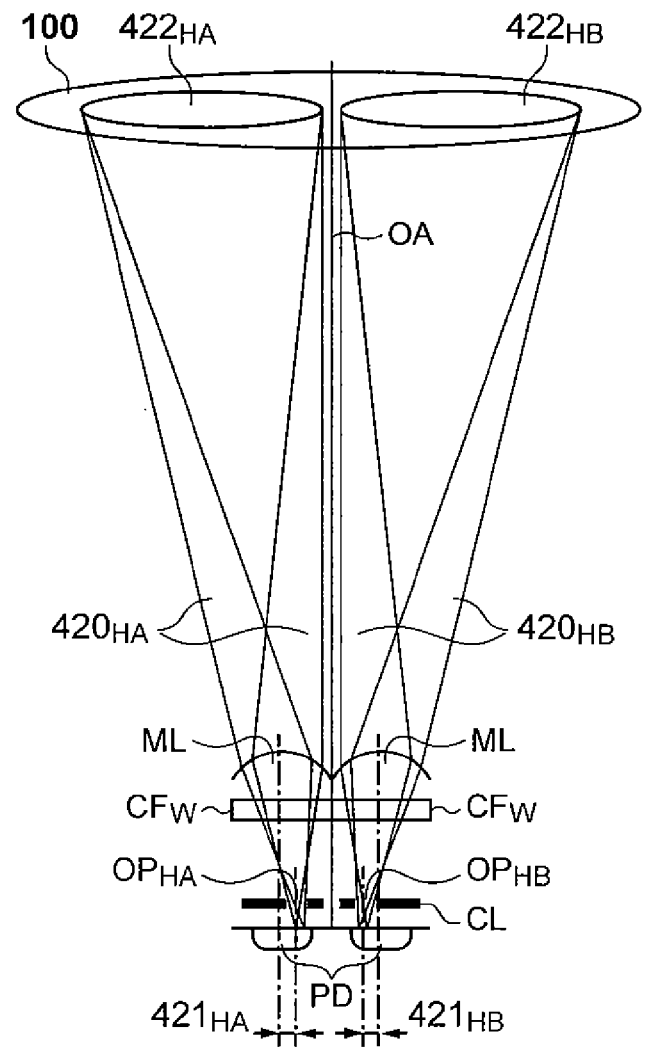

FIGS. 3A to 4B are views for explaining the structure of the imaging pixels and focus detecting pixels of the pixel units shown in FIG. 2. FIGS. 3B and 4B are optical sectional views showing the lens unit 100 and image sensor 122 shown in FIG. 1 when viewed from the upper side. Referring to FIGS. 3B and 4B, the lens unit 100 is shown as one virtual lens. Note that members which are not necessary for description are not shown. In this embodiment, a Bayer arrangement in which, among 2×2=4 pixels, pixels having G (green) spectral sensitivity are arranged as two diagonal pixels, a pixel having R (red) spectral sensitivity and a pixel having B (blue) spectral sensitivity are arranged as the two remaining pixels is adopted. Focus detecting pixels with a structure (to be described later) are arranged between Bayer arrangements.

FIGS. 3A and 3B show the arrangement and structure of imaging pixels. FIG. 3A is a plan view showing 2×2 imaging pixels. In the Bayer arrangement, G pixels are diagonally arranged, and an R pixel and a B pixel are arranged as the two remaining pixels. The structure of such 2×2 pixels is repeatedly arranged. FIG. 3B is a sectional view taken along a line A-A in FIG. 3A. Referring to FIG. 3B, reference symbol ML denotes an on-chip microlens disposed in front of each pixel; CFR, an R (red) color filter; and CFG, a G (green) color filter. Reference symbol PD (Photo Diode) denotes a schematic photoelectric conversion element of a CMOS image sensor. Reference symbol CL (Contact Layer) denotes an interconnection layer for forming a signal line for transmitting various signals within the CMOS image sensor. FIGS. 3A and 3B show the structure of pixels near the center of the image sensor 122, that is, near the optical axis OA of the lens unit 100.

The on-chip microlens ML and photoelectric conversion element PD of the imaging pixel are configured to capture a light beam having passed through the lens unit 100 as effectively as possible. In other words, an exit pupil 411 of the lens unit 100 and the photoelectric conversion element PD are conjugate to each other via the microlens ML, and the effective area of the photoelectric conversion element is designed large. FIG. 3B shows light beams 410, and the entire area of the exit pupil 411 is captured by the photoelectric conversion element PD. Although the light beam entering the R pixel has been described with reference to FIG. 3B, the G and B (blue) pixels have the same structure. The members around the microlens ML are enlarged for easy understanding, but are actually in micron order.

FIGS. 4A and 4B show the arrangement and structure of focus detecting pixels for dividing the pupil of the lens unit 100 in the horizontal direction. The horizontal direction is defined as the X-axis direction shown in FIG. 1 and the longitudinal direction of the image sensor 122 shown in FIG. 2. FIG. 4A is a plan view showing 2×2 pixels including focus detecting pixels. When obtaining an image signal for recording or viewing, G pixels acquire the main component of luminance information. The image recognition feature of a man is sensitive to luminance information. If G pixels are omitted, degradation of the image quality is readily perceived. On the other hand, R or B pixels acquire color information (color difference information). The human visual characteristics are not sensitive to color information. Therefore, even if some pixels for acquiring color information are omitted, degradation of the image quality is hardly recognized. In the embodiment, therefore, G pixels of 2×2 pixels are left as imaging pixels, and R and B pixels are replaced with focus detecting pixels. In FIG. 4A, SHA and SHB represent the focus detecting pixels.

FIG. 4B is a sectional view taken along a line A-A in FIG. 4A. The microlens ML and photoelectric conversion element PD have the same structures as those of the imaging pixels shown in FIG. 3B. FIG. 4B is a view showing the structure of pixels near the center of the image sensor 122, that is, near the optical axis OA of the lens unit 100. In this embodiment, since a signal from the focus detecting pixel is not used to generate an image, a transparent film CFW (white) is arranged instead of a color filter for color separation. To divide the exit pupil 411 by the image sensor, the opening portion of the interconnection layer CL is decentered in one direction from the center line of the microlens ML. More specifically, an opening portion OPHA of the pixel SHA is decentered to the right by 421HA from the center line of the microlens ML, and thus receives a light beam 420HA having passed through an exit pupil area 422HA on the left side with respect to the optical axis OA of the lens unit 100. Similarly, an opening portion OPHB of the pixel SHB is decentered to the left by 421HB from the center line of the microlens ML, and thus receives a light beam 420HB having passed through an exit pupil area 422HB on the right side with respect to the optical axis OA of the lens unit 100. As is apparent from FIGS. 4A and 4B, the decentering amount 421HA equals the decentering amount 421HB. By decentering the microlens ML and opening portions OPHA and OPHB, the light beams 420 having passed through the different pupil areas of the lens unit 100 can be extracted.

In this arrangement, a plurality of pixels SHA are arranged in the horizontal direction, and an object image acquired by these pixels is defined as image A. A plurality of pixels SHB are also arranged in the horizontal direction, and an object image acquired by these pixels is defined as image B. By detecting the relative positions of images A and B, the defocus amount of the object image can be detected. The image sensor 122, therefore, functions as a focus detection means. In this embodiment, the pixels SHA and SHB are selected from three or more pixel groups which respectively receive light beams having passed through difference exit pupil areas, thereby performing focus detection. Detailed description thereof will be described later.

Note that FIGS. 4A and 4B show the focus detecting pixels near the center of the image sensor 122. At portions other than the center, the microlens ML and the opening portions OPHA and OPHB of the interconnection layer CL are decentered differently from that in FIG. 4B, thereby dividing the exit pupil 411. The opening portion OPHA will be exemplified. The opening portion OPHA is decentered so that the sphere center of the almost spherical microlens ML coincides with a line connecting the centers of the opening portion OPHA and exit pupil area. Even at the periphery of the image sensor 122, almost the same pupil division as that by focus detecting pixels near the center shown in FIGS. 4A and 4B can be achieved.

The pixels SHA and SHB enable focus detection for an object, for example, a vertical line having a luminance distribution in the horizontal direction of the photographing frame, but cannot do it for a horizontal line having a luminance distribution in the vertical direction. To detect a horizontal line, pixels are arranged to divide the pupil even in the vertical direction of the photographing lens. The embodiment employs a pixel structure for focus detection in both the vertical and horizontal directions. The focus detecting pixel does not hold original color information. When forming a photographed image, a signal is generated by interpolation calculation using pixel signals from the periphery. Focus detecting pixels are arranged not successively but discretely on the image sensor 122. This arrangement does not degrade the quality of a photographed image.

As described above with reference to FIGS. 2, 3A, 3B, 4A, and 4B, the image sensor 122 has not only the image capture function but also the function of the focus detection means. As a focus detection method, it is possible to perform the AF processing by the phase-difference detection method since focus detecting pixels for receiving light beams which divide the exit pupil 411 are arranged.

As shown in FIGS. 4A and 4B, when performing focus detection using light beams having passed through part of the exit pupil of the imaging optical system, if the position of the exit pupil moves, the light beams to be used for focus detection are shaded, that is, so-called vignetting occurs, thereby decreasing the accuracy of focus detection or disabling focus detection. In the image capture apparatus of this embodiment, the image sensor 122 includes pixels for receiving light beams having passed through a plurality of exit pupil positions to allow focus detection even if the position of the exit pupil moves by a shift or tilt operation of the imaging optical system.

A plurality of kinds of pixels on the image sensor of the image capture apparatus according to the embodiment will be described with reference to FIGS. 5, 6, and 7A to 7E.

Figure 5:
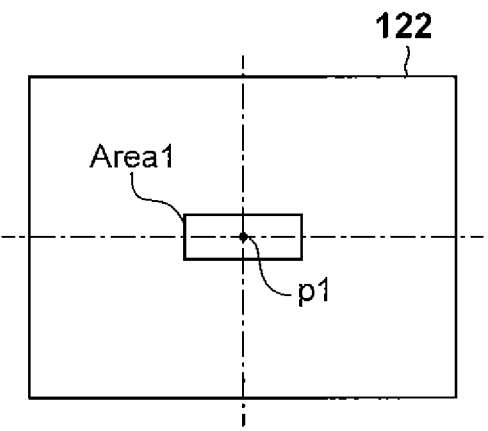
FIG. 5 is a view for explaining the focus detecting area of the image sensor.
Figure 6:
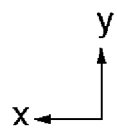
FIG. 6 is a view showing a pixel arrangement within the focus detecting area.

FIG. 5 is a view for explaining a focus detecting area on the image sensor. FIG. 6 is a view showing a pixel arrangement within the focus detecting area. FIGS. 7A to 7E are views for explaining the pupil light-receiving area of the focus detecting pixels of the image sensor 122.

A case in which focus adjustment of the lens unit 100 with respect to an object at a position p1 in almost the center of the image sensor 122 is instructed will be described.

In the camera main body 120, as shown in FIG. 5, if focus adjustment of the lens unit 100 with respect to the object at the position p1 in almost the center of the image sensor 122 is instructed, the camera MPU 125 sets, as focus detecting area Area1, a predetermined area with the position p1 as a center. The size of focus detecting area Area1 is set such that both far and near objects do not exist within the area.

FIG. 6 is a view showing the pixel arrangement of part of the focus detecting area. A rectangular area in FIG. 6 represents one pixel, and a character "R", "G", or "B" in each pixel represents the color of the color filter of the pixel. An "R" pixel transmits the red component of light, a "G" pixel transmits the green component of light, and a "B" pixel transmits the blue component of light. Each of the "R", "G", and "B" pixels is configured to receive light having passed through the entire pupil area of the lens unit 100.

For a color filter having a Bayer arrangement, one picture element is formed by an "R" pixel, a "B" pixel, and two "G" pixels. In the image sensor of the image capture apparatus of the embodiment, focus detecting pixels for receiving light having passed through part of the pupil area of the lens unit 100 are assigned to some of the "R" or "B" pixels. A hatched portion of the focus detecting pixels is shaded from the light, and an area other than the hatched portion represents a light-receiving unit.

Referring to FIG. 6, pixels Pa1, Pb1, Pa2, Pb2, Pa3, Pb3, Pa4, Pb4, Pa5, and Pb5 are used to detect the focus state of the lens unit 100. As pixels having different decentering amounts of the opening portion OPHA in the X direction with respect to the microlens ML, which have been explained with reference to FIGS. 4A and 4B, the pixels Pa1, Pa2, Pa3, Pa4, and Pa5 are arranged every four pixels in the Y direction. Furthermore, as pixels having different decentering amounts of the opening portion. OPHB in the Y direction with respect to the microlens ML, which have been explained with reference to FIGS. 4A and 4B, the pixels Pb1, Pb2, Pb3, Pb4, and Pb5 are arranged every four pixels in the Y direction. The pixels Pa1, Pb1, Pa2, Pb2, Pa3, Pb3, Pa4, Pb4, Pa5, and Pb5 are arranged every four columns. As focus detecting pixels arranged in part of the image sensor 122 of the embodiment, five types of pixels having different opening center positions within the respective pixels are set in both the X direction (a direction perpendicular to the optical axis) and the Y direction (a direction perpendicular to the optical axis). Focus detecting pixels having identical opening center positions within the pixels are arranged every four pixels in the X direction as a first correlation direction, thereby forming a focus detecting visual field in the horizontal (X) direction. Similarly, focus detecting pixels having identical opening center positions within the respective pixels are arranged every 20 pixels in the Y direction as a second correlation direction, thereby forming a focus detecting visual field in the vertical (Y) direction.

A method of arranging focus detecting pixels divided into at least three light-receiving areas is not limited to that shown in FIG. 6. In FIG. 6, pixels with the same opening decentering amount are arranged in the same row. With this arrangement, it is possible to efficiently read out pixels with a target opening decentering amount to be used for focus detection by selecting a row to be read out, thereby reading out a signal from the image sensor 122.

On the other hand, in a method of arranging pixels having different pixel opening decentering amounts and directions, a group of pixels having two different pixel opening decentering amounts to be used for focus detection are desirably arranged close to each other as much as possible on the image sensor. The output signals of the group of two pixels thus have highly identical shapes. Although, therefore, a pixel with the opening decentered in the X direction and that with the opening decentered in the Y direction are arranged to be diagonally adjacent to each other in FIG. 6, a pair of pixels with the same pixel opening decentering direction and with opening decentering amounts that are often used may be arranged to be diagonally adjacent to each other. In general, as the number of focus detecting pixels increases with respect to all the pixels of the image sensor, improvement in accuracy of focus detection is expected but the image quality is more adversely affected. It is, therefore, only necessary to arrange focus detecting pixels so as to achieve both high image quality and high accuracy of focus detection.

FIGS. 7A to 7E are views for explaining a light-receiving area, on the exit pupil of the lens unit 100, of focus detecting pixels positioned at almost the center of the image sensor 122. A black area indicates the exit pupil of the lens unit 100 while a white area indicates the light-receiving area of the focus detecting pixels. The exit pupil of the lens unit 100 is circle since no eclipse occurs. FIGS. 7A to 7E each show a case in which no manufacturing misregistration occurs for the photoelectric conversion unit PD and microlens ML of the image sensor 122.

Figure 7A:
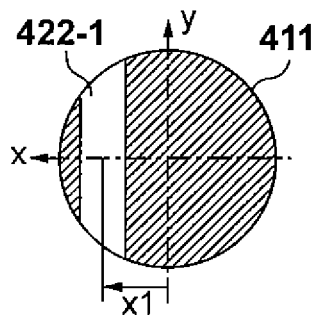
FIGS. 7A to 7E are views for explaining the pupil light-receiving area of the focus detecting pixels of the image sensor.

FIG. 7A shows, as a first light-receiving area 422-1, the light-receiving area (divided pupil area) of the focus detecting pixels of the image sensor 122 on the exit pupil. The first light-receiving area 422-1 corresponds to the pixels Pa1 shown in FIG. 6. Since the center of the opening of the focus detecting pixel is significantly decentered in the −X direction with respect to the center of the pixel, the center of the light-receivable area of the photoelectric conversion unit of the focus detecting pixel is decentered by x1 with respect to the optical axis (the intersection of the X and Y axes in FIG. 7A) on the exit pupil of the lens unit 100.

Figure 7B:
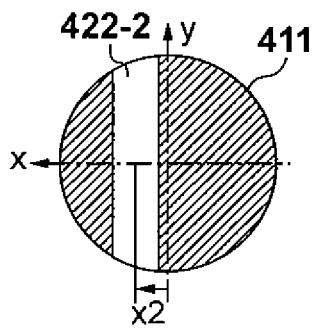

FIG. 7B shows, as a second light-receiving area 422-2, the light-receiving area of the focus detecting pixels of the image sensor 122 on the exit pupil. The second light-receiving area 422-2 corresponds to the pixels Pa2 shown in FIG. 6. Since the center of the opening of the focus detecting pixel is slightly decentered in the −X direction with respect to the center of the pixel, the center of the light-receivable area of the photoelectric conversion unit of the focus detecting pixel is decentered by x2 with respect to the optical axis (the intersection of the X and Y axes in FIG. 7B) on the exit pupil of the lens unit 100.

Figure 7C:
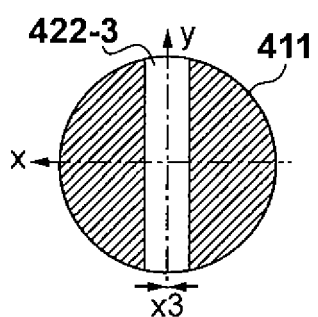

FIG. 7C shows, as a third light-receiving area 422-3, the light-receiving area of the focus detecting pixels of the image sensor 122 on the exit pupil. The third light-receiving area 422-3 corresponds to the pixels Pa3 shown in FIG. 6. Since the center of the opening of the focus detecting pixel is not decentered with respect to the center of the pixel, the center of the light-receivable area of the photoelectric conversion unit of the focus detecting pixel coincides with the optical axis (the intersection of the X and Y axes in FIG. 7C) on the exit pupil of the lens unit 100. That is, x3 in FIG. 7C is 0.

Figure 7D:
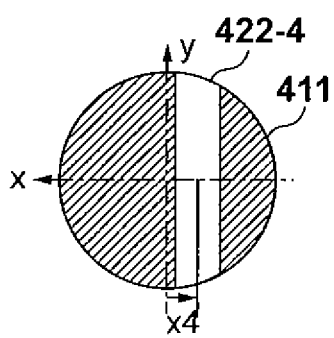

FIG. 7D shows, as a fourth light-receiving area 422-4, the light-receiving area of the focus detecting pixels of the image sensor 122 on the exit pupil. The fourth light-receiving area 422-4 corresponds to the pixels Pa4 shown in FIG. 6. Since the center of the opening of the focus detecting pixel is slightly decentered in the +X direction with respect to the center of the pixel, the center of the light-receivable area of the photoelectric conversion unit of the focus detecting pixel is decentered by x4 with respect to the optical axis (the intersection of the X and Y axes in FIG. 7D) on the exit pupil of the lens unit 100.

Figure 7E:
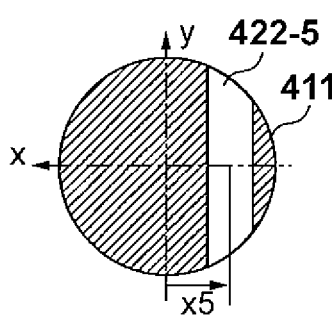

FIG. 7E shows, as a fifth light-receiving area 422-5, the light-receiving area of the focus detecting pixels of the image sensor 122 on the exit pupil. The fifth light-receiving area 422-5 corresponds to the pixels Pa5 shown in FIG. 6. Since the center of the opening of the focus detecting pixel is significantly decentered in the +X direction with respect to the center of the pixel, the center of the light-receivable area of the photoelectric conversion unit of the focus detecting pixel is decentered by x5 with respect to the optical axis (the intersection of the X and Y axes in FIG. 7E) on the exit pupil of the lens unit 100.

The decentering amounts shown in FIGS. 7A to 7E satisfy $x1 > x2 > x3 = 0 > x4 > x5$. The five pixel groups constitute the focus detecting pixels arranged in focus detecting area Area1 shown in FIG. 6 in equal proportions.

The image sensor 122 of the embodiment selects, as a pair of pixel groups to undergo focus detection calculation, two of the five areas (422-1 to 422-5) having different light-receiving areas on the exit pupil, and performs focus detection using a signal obtained from the photoelectric conversion unit. In focus detection by the phase-difference detection method, a phase-difference detection result corresponding to a defocus amount changes depending on the centroid interval between the light-receiving areas on the exit pupil. In the embodiment, by switching the sensitivity of a phase-difference detection result corresponding to a defocus amount in accordance with a selected pixel groups, it is possible to perform focus detection irrespective of the selected pixel groups.

The camera MPU 125 determines the vignetting situation of the focus detecting light beam of each focus detecting pixel group by the lens frame of the lens unit 100, and selects a pixel group to undergo focus detection calculation. The vignetting situation of the focus detecting light beam is calculated based on the lens frame information of the lens unit 100 and the light-receiving angle distribution of focus detecting pixels forming part of the image sensor 122.

FIGS. 8A to 8D are views for explaining the vignetting situation of a focus detecting light beam and a focus detecting pixel group to be selected.

Similarly to FIGS. 7A to 7E, FIG. 8A is a view showing, on the exit pupil, the light-receiving areas of the focus detecting pixels of the image sensor 122, and shows the first to fifth areas (422-1 to 422-5) shown in FIGS. 7A to 7E on the exit pupil. Although the light-receiving areas of the focus detecting pixels are adjacent to each other on the exit pupil in FIGS. 8A to 8D, the arrangement method is not limited to this. The areas may be arranged to overlap each other or not to overlap each other. This can be done by changing settings of the opening positions which determine the light-receiving areas of the focus detecting pixels. Referring to FIGS. 8A to 8D, the rectangular light-receiving areas of the focus detecting pixels are shown as back projection images of the openings of the pixels on the exit pupil. A light beam received by the focus detecting pixels is indicated by a common part of the exit pupil area and light-receiving areas.

Figure 8A:
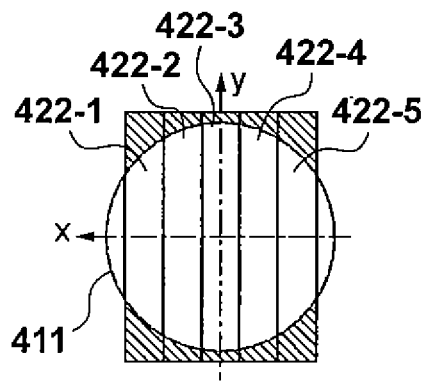
FIGS. 8A to 8D are views for explaining the vignetting situation of a focus detecting light beam and a selected focus detecting pixel group.

In the state shown in FIG. 8A, all the areas are selected as focus-detectable light-receiving areas. A light-receiving area selection method will be described later.

Figure 8B:
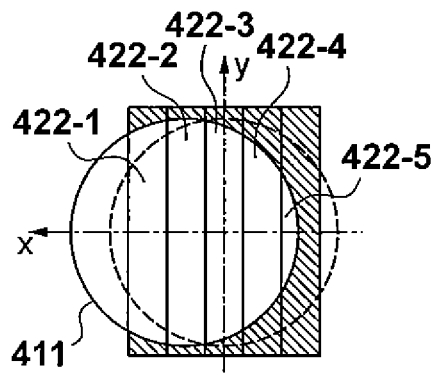

FIG. 8B shows a case in which the operation of the shift/tilt/rotation operation member 140 moves the imaging optical system of the lens unit 100 with respect to the mount M to move the position of the exit pupil in the X direction. A solid line indicates the exit pupil after the movement, and a broken line indicates the exit pupil before the movement.

Irrespective of the movement of the exit pupil, the light-receiving areas of the focus detecting pixels do not change. The degree of vignetting is higher and the light receiving area on the exit pupil is smaller toward an area existing in the –X direction, that is, toward the fifth area (422-5) side. On the other hand, for the first area (422-1), as the position of the exit pupil moves, the light-receiving area on the exit pupil becomes larger and the amount of received light increases. In this manner, the vignetting situation of the focus detecting pixel group changes depending on the position of the exit pupil. If the amount of light of a pixel group used for focus detection is small, a light amount correction and the like are generally performed for an output signal. Since, however, the correction increases noise, the accuracy of focus detection deteriorates as the amount of light is smaller. In this embodiment, the vignetting situation of each pixel group is calculated using lens information obtained from the lens MPU, and a pixel group to be used for focus detection is determined from pixel groups obtained by excluding pixel groups with a small amount of light.

In the light-receiving areas on the exit pupil which have been explained with reference to FIGS. 7A to 7E and 8A to 8D, since the focus detecting area is near the center of the image sensor, it is possible to calculate the vignetting situation of each pixel group based on the light-receiving area of each pixel group and the position and diameter of the exit pupil of the lens. On the other hand, if the focus detecting areas are in the periphery of the image sensor, it is possible to calculate the vignetting situation of each pixel group using the position and diameter of the lens frame in addition to the light-receiving area of each pixel group and the position and diameter of the exit pupil of the lens. The vignetting situation of the periphery will be described later.

As described above, a focus-detectable pixel group is determined according to the vignetting situation of each pixel group calculated using the information of the exit pupil and lens frame. The pixel group selection method will be described later.

In FIG. 8B, the first to fourth areas (422-1 to 422-4) in each of which the area of the light-receiving area is equal to or larger than a predetermined value are considered as pixel groups which can be used for focus detection. A method of selecting and using a pair of pixel groups, among the signals of the four pixel groups which can be used for focus detection, to perform focus detection will be described later.

Figure 8C:
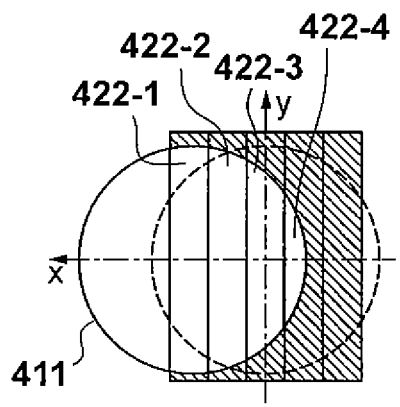

FIG. 8C shows a case in which the position of the exit pupil has significantly moved in the X direction with respect to the state shown in FIG. 8B. In FIG. 8C, the first to third areas (422-1 to 422-3) in each of which the area of the light-receiving area is equal to or larger than the predetermined value are set as pixel groups which can be used for focus detection.

Figure 8D:
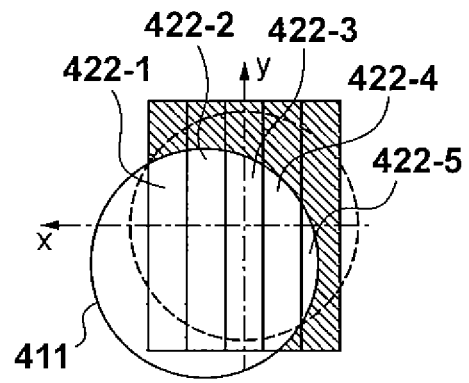

FIG. 8D shows a case in which the position of the exit pupil has largely moved not only in the X direction but also in the Y direction. Since the exit pupil has moved in the Y direction, the light-receiving areas of the focus detecting pixels partially run short in the Y direction. Each of the first to fourth areas (422-1 to 422-4) has a light-receiving area equal to or larger than a predetermined value. A pixel group to be used for focus detection is selected from the first to fourth areas (422-1 to 422-4).

As is apparent from FIGS. 8A to 8D, as the movement amount of the exit pupil position in the X direction is larger, the number of focus-detectable pixel groups is smaller. If the exit pupil position moves in the +X direction, at least the first light-receiving area 422-1 and the second light-receiving area 422-2 need to be focus-detectable areas. In other words, focus-detectable focus detecting areas are set according to the movement amount of the exit pupil position. The camera MPU 125 displays all the focus-detectable areas on the display device 126 according to the movement amount of the exit pupil position. This allows the user to readily set the focus detecting areas.

In FIGS. 8A to 8D, as the displacement amount of the exit pupil position in the X-axis direction increases from FIG. 8A to FIG. 8C, the focus-detectable light-receiving areas change. In FIG. 8A, the pixel groups of the second light-receiving area 422-2 and fourth light-receiving area 422-4 are switched according to the exit pupil position. In FIG. 8B, the pixel groups of the first light-receiving area 422-1 and third light-receiving area 422-3 are switched according to the exit pupil position. That is, in the embodiment, among focus-detectable pixels, a pair of pixels for which the distance between light-receiving pupil areas is longest is selected. This increases a base-line length for focus detection, thereby improving the accuracy of focus detection. Alternatively, among focus-detectable pixels, a pair of pixels for which the difference in amount of light between light beams having passed through the pixels is smallest may be selected. This decreases the difference in waveform between two images for detecting a phase difference, thereby improving the accuracy of focus detection.

Figure 9A:
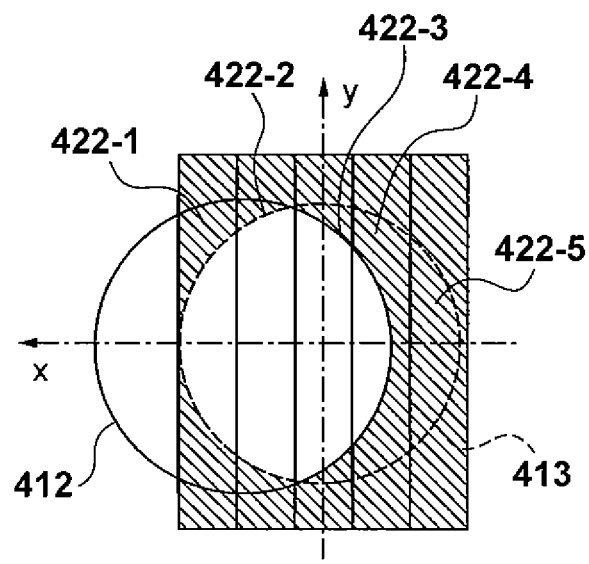
FIGS. 9A and 9B are views for explaining the vignetting situation of pixels positioned in the periphery of the image sensor.

The vignetting situation of the periphery will be described with reference to FIGS. 9A and 9B. FIG. 9A shows the vignetting situation of a pixel arranged at a given image height in the X direction with respect to the position p1 shown in FIG. 5. Similarly to FIGS. 8A to 8D, for the first to fifth areas (422-1 to 422-5) on the exit pupil, the light-receiving areas are limited by a front lens frame 412 and a rear lens frame 413. As shown in FIGS. 8A to 8D, if the imaging optical system of the lens unit 100 moves in the X direction with respect to the mount M, the front lens frame 412 and rear lens frame 413 move together in the X direction with respect to the first to fifth areas (422-1 to 422-5) on the exit pupil. In the vignetting situation of a pixel at a higher image height in the X direction, the front lens frame 412 has moved in the +X direction and the rear lens frame 413 has moved in the –X direction.

In the periphery, if no misregistration occurs for the imaging optical system (exit pupil and lens frame) with respect to the central area, the amount of light shaded by the imaging optical system is large, that is, limitation on the light-receiving areas is strict. In the periphery, therefore, the number of light-receiving areas usable for focus detection is small. If the imaging optical system largely moves, the number of light-receiving areas usable for focus detection is smaller than two, thereby disabling focus detection.

Figure 9B:
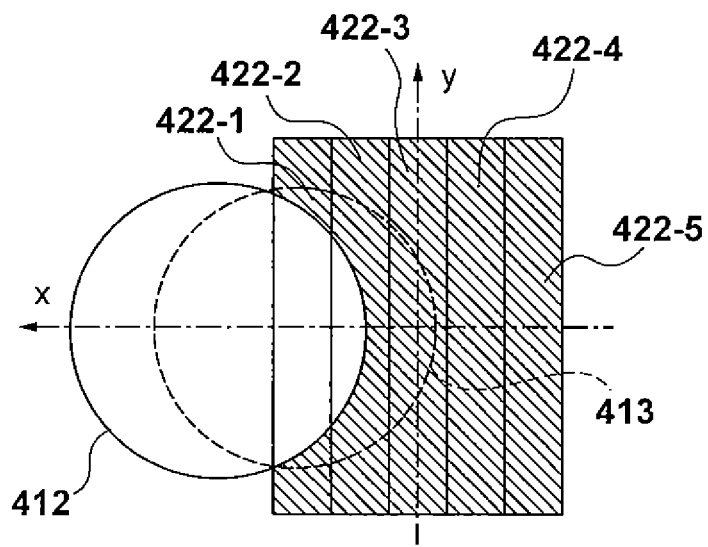

For example, FIG. 9B shows the vignetting situation of the periphery when the imaging optical system moves as described with reference to FIG. 8C. As is apparent from FIG. 9B, the second area (422-2) does not have an area as a light-receiving area, and only the first area (422-1) is a pixel group usable for focus detection. In this case, it is impossible to perform focus detection.

Figure 10:
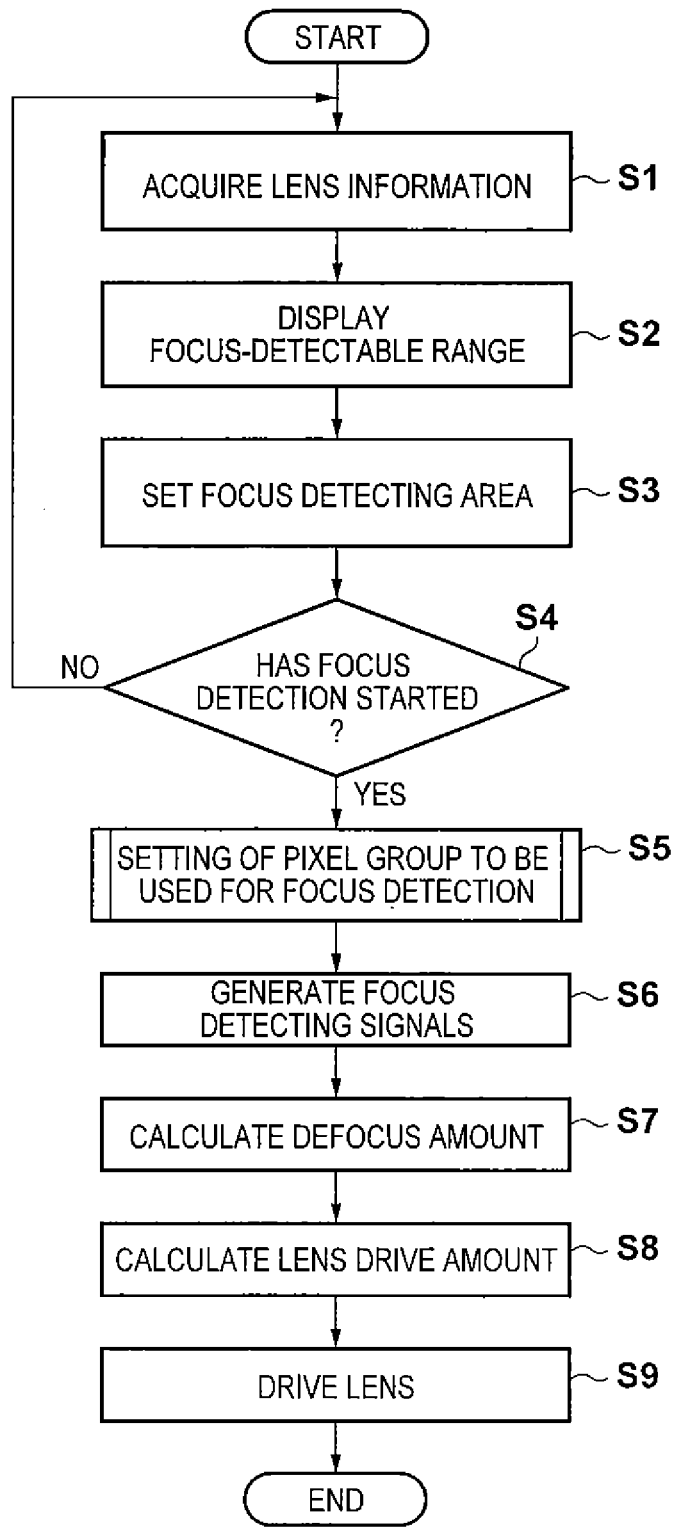
FIG. 10 is a flowchart illustrating a focus detection operation according to the embodiment of the present invention.

As described above, as the image height of the position of the focus detecting area of the image sensor 122 is larger, the movement amount of the imaging optical system allowable for focus detection is limited. In the embodiment, therefore, a focus-detectable range is set according to the movement amount of the imaging optical system. A detailed description of this setting will be provided later. An actual operation in the camera main body 120 will now be described. FIG. 10 is a flowchart illustrating an actual focus detection operation stored in the imaging plane phase-difference focus detection unit 129. Note that the flowchart indicates the operation of an electronic viewfinder for performing focus detection using the phase-difference detection method by the image sensor 122, or an operation in moving image photography. That is, a focus detection operation is executed while display for the electronic viewfinder or moving image recording is performed.

In step S1, the camera MPU 125 acquires various kinds of lens information such as the above-described exit pupil information, lens frame information, and focus lens position of the lens unit 100 from the lens MPU 117.

In step S2, a focus-detectable area is calculated using the various kinds of lens information acquired from the lens unit 100. As described with reference to FIGS. 8A to 8D, 9A, and 9B, the area is determined depending on whether there are two or more pixel groups in which an amount of light equal to or larger than a predetermined amount is obtained, using information of the displacement direction, displacement amount, position, and diameter of the exit pupil contained in the lens information, and information of the light-receiving areas and pupil division direction of the focus detecting pixels. The calculated focus-detectable area is displayed on the display device 126.

Figure 11:
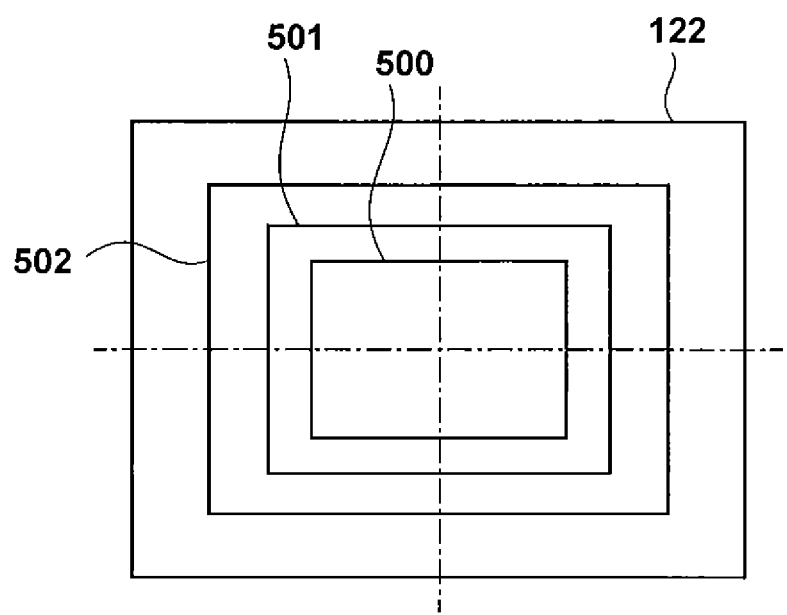
FIG. 11 is a view for explaining display of a focus-detectable area.

Display of the focus-detectable area will be described with reference to FIG. 11. As described above, whether focus detection of the periphery of the image sensor is possible is determined based on the movement amount of the imaging optical system (exit pupil and lens frame) and a position on the image sensor where focus detection is performed. To do this, a focus-detectable area on the image sensor is calculated using the movement amount information of the imaging optical system obtained in step S2. Focus-detectable areas 500, 501, and 502 are examples of the calculated focus-detectable area on the image sensor 122. If the movement amount of the imaging optical system is small, focus detection is possible in a relatively wide area, and thus the focus-detectable area 502 is displayed on the display device 126. As the movement amount of the imaging optical system is larger, the focus-detectable area is made smaller like the focus-detectable areas 501 and 500, and is displayed.

In step S3, the user sets a focus detecting area. The user sets one or a plurality of focus detecting areas, or sets a mode in which the camera MPU 125 automatically selects a focus detecting area. If a focus detecting area has already been set, the setting is continuously used.

In step S4, it is detected whether a focus detection start instruction button is turned on by the operation of the operation switch group 127. If the button is turned on, the process advances to step S5. In this example, determination is made using the focus detection start button. However, focus detection may start using, as a trigger, display of the electronic viewfinder or transition to moving image recording. If no focus detection start instruction is detected in step S4, the process returns to step S1. This processing enables to update the focus-detectable area as needed even if the user operates the shift/tilt/rotation operation member 140 to move the imaging optical system.

In step S5, subroutine processing of setting a pixel group to be used for focus detection is executed. The setting method will be described later.

In step S6, the image processing circuit 124 generates a pair of focus detecting signals from image signals successively read out. The focus detecting signals are sent to the imaging plane phase-difference focus detection unit 129, and the process advances to step S7. The imaging plane phase-difference focus detection unit 129 performs, for example, light amount correction, that is, so-called vignetting correction for reducing the influence of vignetting.

In step S7, the imaging plane phase-difference focus detection unit 129 calculates the shift amount of the pair of focus detecting signals using a known correlation calculation operation, and converts it into a defocus amount. In step S8, the lens drive amount of the focus lens 104 is calculated based on the focus detection result calculated in step S7.

In step S9, the camera MPU 125 sends the lens drive amount to the lens MPU, and drives the focus lens, thereby performing focus adjustment of the lens unit 100.

The focus detection operation of the camera main body 120 according to the embodiment has been described.

Figure 12:
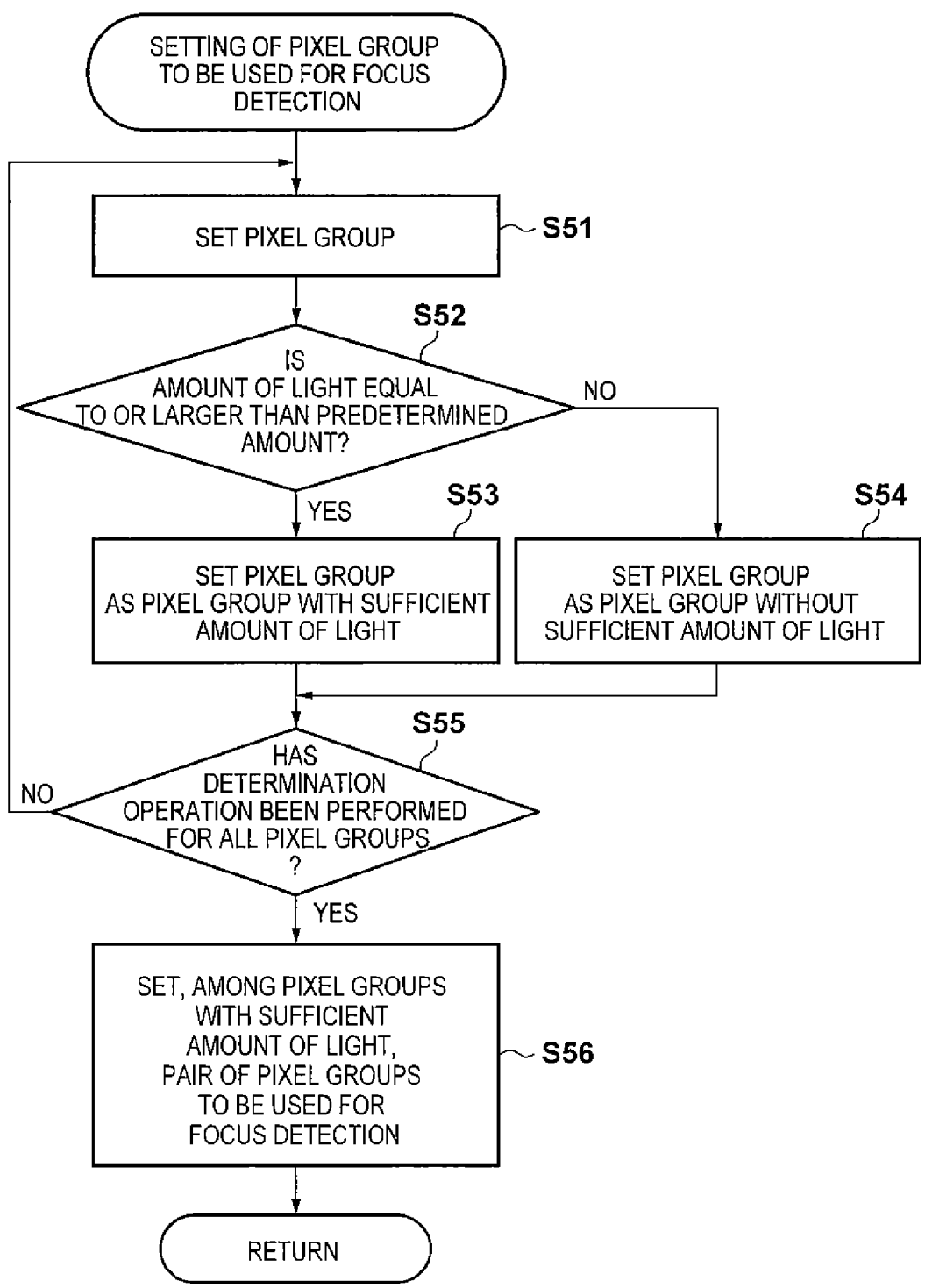
FIG. 12 is a flowchart illustrating a pixel group setting subroutine used for focus detection.

The pixel group setting subroutine used for focus detection, which is executed in step S5 of FIG. 10, will be described. FIG. 12 is a flowchart illustrating the pixel group setting subroutine used for focus detection.

In step S51, a pixel group for determining the amount of light later is set. In the example shown in FIGS. 8A to 8D, the first light-receiving area 422-1 is set.

In step S52, it is determined whether the amount of light of the set pixel group is equal to or larger than a predetermined amount. This determination can be performed based on whether the area of the common area of the exit pupil area described with reference to FIGS. 8A to 8D, or the ratio of the common area of the exit pupil area to the area of all light beams on the exit pupil is larger or smaller than a predetermined value. By preventing a pixel group with a small amount of received light from being used for focus detection, it is not necessary to increase the gain of an output signal obtained from a pixel group, thereby enabling focus detection using a signal with little noise.

If it is determined in step S52 that the amount of light is equal to or larger than the predetermined amount, the process advances to step S53 to set the determined pixel group as a pixel group with a sufficient amount of light. On the other hand, if it is determined that the amount of light is smaller than the predetermined amount, the process advances to step S54 to set the determined pixel group as a pixel group without a sufficient amount of light. Upon completion of the processing in step S53 or S54, the process advances to step S55 to determine whether the determination operation has been performed for all the pixel groups. In the example shown in FIGS. 8A to 8D, since the amount of light of the first light-receiving area 422-1 has been determined, the amounts of light of the remaining second to fifth light-receiving areas (422-2 to 422-5) are sequentially determined.

If the determination operation has been performed for all the light-receiving areas, the process advances to step S56 to set, among pixel groups with the sufficient amount of light, a pair of pixel groups to be used for focus detection. A pair of pixel groups for which the distance between the centers of the light-receiving areas on the exit pupil is longest is set so that the sensitivity of a phase-difference detection result corresponding to a defocus amount is large. In FIG. 8B, for example, if the amounts of light of the first to fourth light-receiving areas are sufficient, the pixel groups of the first light-receiving area 422-1 and the fourth light-receiving area 422-4 are set. In this way, the phase difference of output signals obtained from the pair of pixel groups corresponding to a unit defocus amount becomes large, thereby enabling high accuracy focus detection.

Note that the method of setting a pair of pixel groups is not limited to this. It may be preferable that a difference in amount of received light between a pair of pixel groups becomes small. In FIG. 8B, for example, if the amounts of light of the first to fourth light-receiving areas are sufficient, the first light-receiving area 422-1 and the third light-receiving area 422-3 are selected. According to this method, it is possible to keep a difference in amount of light between a pair of optical images as small as possible, and to make a correction error in light amount correction small, thereby enabling high accuracy focus detection.

A method of setting all pairs of pixel groups is also plausible. A final result may be obtained from the focus detection results of a plurality of pairs in calculation of defocus amounts in step S7. Since it is possible to calculate a plurality of defocus amounts, a high accuracy focus detection result can be obtained.

As described above, it is possible to provide an image capture apparatus which enables high-speed focus adjustment irrespective of the position of the exit pupil of a photographing lens by switching a pixel group to be used for focus detection according to the position of the exit pupil of the photographing lens.

In the embodiment, a case in which light-receiving areas for dividing the exit pupil in the X direction are set has been described. The present invention, however, is not limited to this, and is applicable to a case in which light-receiving areas for dividing the exit pupil in the Y direction are set using the focus detecting pixels Pb1, Pb2, Pb3, Pb4, and Pb5 shown in FIG. 6. If the exit pupil is divided in the Y direction, the vignetting situation changes and thus the light-receiving areas tend to be limited when the exit pupil moves in the Y direction. By switching between the focus detecting pixels for dividing the pupil in the X direction and those for dividing the pupil in the Y direction in accordance with the movement direction of the exit pupil, it is possible to perform focus detection with high accuracy according to the contrasts in both the X and Y directions.

In the embodiment, focus detecting pixels are arranged in addition to pixels used for image generation, thereby realizing focus detection using the output signals of focus detecting pixels which receive light beams having passed through part of the exit pupil. The method of using focus detecting output signals from the image sensor is not limited to this.

Figure 13:
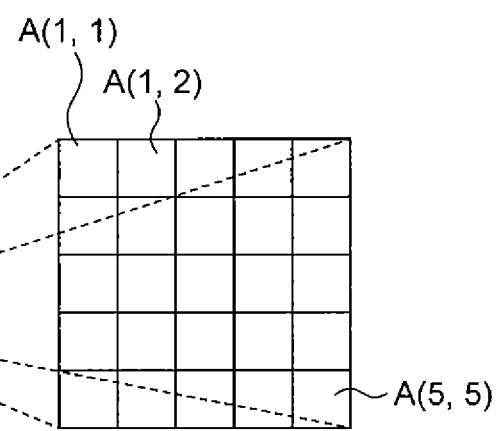
FIG. 13 is a view for explaining a modification of an arrangement in which focus detecting output signals are obtained from the image sensor.

A modification of the arrangement in which focus detecting output signals are obtained from an image sensor will be described with reference to FIG. 13. FIG. 13 is a view showing the pixel arrangement of part of a focus detecting area, as in FIG. 6. In FIG. 13, a rectangular area represents one pixel, and a character "R", "G", or "B" in each pixel represents the color of the color filter of the pixel. Similarly to FIG. 6, one microlens is arranged for each pixel. FIG. 13 also shows an enlarged "G" pixel at the fifth row and eighth column. The image sensor according to the modification includes a plurality of photoelectric conversion units within one pixel. In the example shown in FIG. 13, 5×5 photoelectric conversion units are included. The respective photoelectric conversion units are indicated by row/column numbers A(1, 1), A(1, 2), . . . , A(5, 5). Although the specific "G" pixel has been described with reference to FIG. 13, other pixels are also divided into 5×5 irrespective of the color of the color filter. An image capture apparatus including an image sensor with such an arrangement is disclosed in Japanese Patent Laid-Open No. 2007-4471 and the like.

In the image sensor with the above-described arrangement, the respective photoelectric conversion units can receive light beams having passed through different areas on the exit pupil. To cause the image sensor shown in FIG. 13 to obtain an output equivalent to that of the pixel Pa1 (the first light-receiving area 422-1) shown in FIG. 6, it is only necessary to calculate the sum of the outputs of the photoelectric conversion units A(1, 1), A(2, 1), A(3, 1), A(4, 1), and A(5, 1). To cause the image sensor shown in FIG. 13 to obtain an output equivalent to that of the pixel Pa5 (the fifth light-receiving area 422-5), it is only necessary to calculate the sum of the outputs of the photoelectric conversion units A(1, 5), A(2, 5), A(3, 5), A(4, 5), and A(5, 5). Furthermore, to obtain a pixel output for a recording image, it is only necessary to calculate the sum of the outputs of all the 5×5 photoelectric conversion units.

As described above, the image sensor of the modification can obtain an output corresponding to a plurality of light-receiving areas from one pixel. Arranging such pixels within a focus detecting area enables to arrange focus detecting pixels at high density instead of discretely arranging focus detecting pixels as in the above-described embodiment, thereby implementing high accuracy focus detection.

Similarly, to cause the image sensor shown in FIG. 13 to obtain an output equivalent to that of the pixel Pb1 shown in FIG. 6, it is only necessary to calculate the sum of the outputs of the photoelectric conversion units A(1, 1), (1, 2), A(1, 3), A(1, 4), and A(1, 5). As described above, by changing the combination of the photoelectric conversion units for which the sum of outputs within one pixel is calculated, it is possible to perform focus detection for an object having a luminance distribution in either the vertical or horizontal direction on a photographing frame. In this case, it is not necessary to arrange focus detecting pixels corresponding to both the vertical and horizontal directions. Since it is possible to obtain an output for image generation, that for focus detection in the vertical direction, and that for focus detection in the horizontal direction from all the pixels, both high image quality and high accuracy focus detection can be implemented.

Although movement of the position of the exit pupil caused by movement of the entire imaging optical system by the shift/tilt/rotation operation member 140 has been explained in this embodiment, the factor in movement of the exit pupil is not limited to this. Even if, for example, an anti-vibration camera shake correction optical system for preventing a camera shake is provided as part of the imaging optical system, it is possible to perform focus detection with high accuracy by applying the present invention.

A camera shake indicates blur of an image caused by movement of a body when pressing a shutter. A camera shake correction lens with a vibration gyro mechanism is incorporated in the image capture apparatus, and the correction lens (part of the imaging optical system) is moved in a direction so as to cancel blur, thereby correcting the optical axis. This suppresses movement of light reaching the light-receiving surface of the image sensor, thereby reducing a camera shake.

Although the preferred embodiment of the present invention has been described, the present invention is not limited to this, and various modifications and changes can be made within the spirit and scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-090453 filed Apr. 11, 2012, which is hereby incorporated by reference herein in its entirety.

What is claimed is:

1. An image capture apparatus comprising:
an image sensor including at least three focus detecting pixels wherein the at least three focusing detecting pixels respectively have light-receiving areas at different positions;
an optical axis displacement unit which displaces an optical axis of an imaging optical system by driving, in a direction different from the optical axis, at least part of the imaging optical system for forming an object image on said image sensor; and
a focus adjustment unit which performs focus adjustment by a phase-difference detection method using a pair of images detected in the at least three focus detecting pixels,
wherein if said optical axis displacement unit moves the at least part of the imaging optical system in a direction different from the optical axis, said focus adjustment unit performs focus adjustment using detection results of a pair of focus detecting pixels, among the at least three focus detecting pixels, other than a focus detecting pixel in which a common part of an exit pupil area of the imaging optical system and the light-receiving area of the focus detecting pixel projected on an exit pupil of the imaging optical system is smallest.

2. The apparatus according to claim 1, wherein an amount of a light beam entering the light-receiving area of the focus detecting pixel having the smallest common part is smaller than a predetermined amount, and an amount of a light beam entering the light-receiving area of each of the pair of focus detecting pixels used for the focus adjustment is not smaller than the predetermined amount.

3. The apparatus according to claim 1, wherein the pair of focus detecting pixels used for the focus adjustment is a pair of focus detecting pixels, among a plurality of focus detecting pixels in each of which an amount of a light beam entering the corresponding light-receiving area is not smaller than a predetermined amount, for which a distance between the pair of focus detecting pixels is longest.

4. The apparatus according to claim 1, wherein the pair of focus detecting pixels used for the focus adjustment is a pair of focus detecting pixels, among a plurality of focus detecting pixels in each of which an amount of a light beam entering the corresponding light-receiving area is not smaller than a predetermined amount, for which a difference between the amounts of light beams entering the corresponding light-receiving areas is smallest.

5. An image capture apparatus comprising:
an image sensor including at least three focus detecting pixels wherein the at least three focusing detecting pixels respectively have light-receiving areas at different positions;
an optical axis displacement unit which displaces an optical axis of an imaging optical system by driving, in a direction different from the optical axis, at least part of the imaging optical system for forming an object image on said image sensor; and
a focus adjustment unit which performs focus adjustment by a phase-difference detection method using a pair of images detected in the at least three focus detecting pixels,
wherein said focus adjustment unit switches a pair of focus detecting pixels, among the at least three focus detecting pixels, to be used for the focus adjustment in accordance with a movement amount of the at least part of the imaging optical system in a direction different from the optical axis by said optical axis displacement unit.

6. An image capture apparatus comprising:
an image sensor including an image capture pixel having at least three photoelectric conversion units;
an optical axis displacement unit which displaces an optical axis of an imaging optical system by driving, in a direction different from the optical axis, at least part of the imaging optical system for forming an object image on said image sensor; and
a focus adjustment unit which performs focus adjustment by a phase-difference detection method using a pair of images detected in the at least three photoelectric conversion units,
wherein if said optical axis displacement unit moves the at least part of the imaging optical system in a direction different from the optical axis, said focus adjustment unit performs focus adjustment using detection results of a pair of photoelectric conversion units, among the at least three photoelectric conversion units, other than a photoelectric conversion unit in which a common part of an exit pupil area of the imaging optical system and the light-receiving area of the photoelectric conversion unit projected on an exit pupil of the imaging optical system is smallest.

7. The apparatus according to claim 6, wherein an amount of a light beam entering the light-receiving area of the photoelectric conversion unit having the smallest common part is smaller than a predetermined amount, and an amount of a light beam entering the light-receiving area of each of the pair of photoelectric conversion units used for the focus adjustment is not smaller than the predetermined amount.

8. The apparatus according to claim 6, wherein the pair of photoelectric conversion units used for the focus adjustment is a pair of photoelectric conversion units, among a plurality of photoelectric conversion units in each of which an amount of a light beam entering the corresponding light-receiving area is not smaller than a predetermined amount, for which a distance between the pair of photoelectric conversion units is longest.

9. The apparatus according to claim 6, wherein the pair of photoelectric conversion units used for the focus adjustment is a pair of photoelectric conversion units, among a plurality of photoelectric conversion units in each of which an amount of a light beam entering the corresponding light-receiving area is not smaller than a predetermined amount, for which a difference between the amounts of light beams entering the corresponding light-receiving areas is smallest.

10. An image capture apparatus comprising:
an image sensor including an imaging pixel having at least three photoelectric conversion units;
an optical axis displacement unit which displaces an optical axis of an imaging optical system by driving, in a direction different from the optical axis, at least part of the imaging optical system for forming an object image on said image sensor; and
a focus adjustment unit which performs focus adjustment by a phase-difference detection method using a pair of images detected in the at least three photoelectric conversion units,
wherein said focus adjustment unit switches a pair of photoelectric conversion units, among the at least three photoelectric conversion units, to be used for the focus adjustment in accordance with a movement amount of the at least part of the imaging optical system in a direction different from the optical axis by said optical axis displacement unit.

11. A method of controlling an image capture apparatus which comprises an image sensor including at least three focus detecting pixels wherein the at least three focus detecting pixels respectively have light-receiving areas at different positions, the method comprising the steps of:
displacing an optical axis of an imaging optical system by driving, in a direction different from the optical axis, at least part of the imaging optical system for forming an object image on the image sensor; and
performing focus adjustment by a phase-difference detection method using a pair of images detected in the at least three focus detecting pixels,
wherein if the at least part of the imaging optical system is moved in a direction different from the optical axis in the step of displacing, focus adjustment is performed using detection results of a pair of focus detecting pixels, among the at least three focus detecting pixels, other than a focus detecting pixel in which a common part of an exit pupil area of the imaging optical system and the light-receiving area of the focus detecting pixel projected on an exit pupil of the imaging optical system is smallest in the step of performing.

12. The method according to claim 11, wherein an amount of a light beam entering the light-receiving area of the focus detecting pixel having the smallest common part is smaller than a predetermined amount, and an amount of a light beam entering the light-receiving area of each of the pair of focus detecting pixels used for the focus adjustment is not smaller than the predetermined amount.

13. The method according to claim 11, wherein the pair of focus detecting pixels used for the focus adjustment is a pair of focus detecting pixels, among a plurality of focus detecting pixels in each of which an amount of a light beam entering the corresponding light-receiving area is not smaller than a predetermined amount, for which a distance between the pair of focus detecting pixels is longest.

14. The method according to claim 11, wherein the pair of focus detecting pixels used for the focus adjustment is a pair of focus detecting pixels, among a plurality of focus detecting pixels in each of which an amount of a light beam entering the corresponding light-receiving area is not smaller than a predetermined amount, for which a difference between the amounts of light beams entering the corresponding light-receiving areas is smallest.

15. A method of controlling an image capture apparatus which comprises an image sensor including at least three focus detecting pixels wherein the at least three focus detecting pixels respectively have light-receiving areas at different positions, the method comprising the steps of:
displacing an optical axis of an imaging optical system by driving, in a direction different from the optical axis, at least part of the imaging optical system for forming an object image on the image sensor; and
performing focus adjustment by a phase-difference detection method using a pair of images detected in the at least three focus detecting pixels,
wherein a pair of focus detecting pixels, among the at least three focus detecting pixels, to be used for the focus adjustment is switched in the step of performing in accordance with a movement amount of the at least part of the imaging optical system in a direction different from the optical axis in the step of displacing.

16. A method of controlling an image capture apparatus which comprises an image sensor including an imaging pixel having at least three photoelectric conversion units, comprising the steps of:
displacing an optical axis of an imaging optical system by driving, in a direction different from the optical axis, at least part of the imaging optical system for forming an object image on the image sensor; and
performing focus adjustment by a phase-difference detection method using a pair of images detected in the at least three photoelectric conversion units,
wherein if the at least part of the imaging optical system is moved in a direction different from the optical axis in the step of displacing, focus adjustment is performed using detection results of a pair of photoelectric conversion units, among the at least three photoelectric conversion units, other than a photoelectric conversion unit in which a common part of an exit pupil area of the imaging optical system and the light-receiving area of the photoelectric conversion unit projected on an exit pupil of the imaging optical system is smallest.

17. The method according to claim 16, wherein an amount of a light beam entering the light-receiving area of the photoelectric conversion unit having the smallest common part is smaller than a predetermined amount, and an amount of a light beam entering the light-receiving area of each of the pair of photoelectric conversion units used for the focus adjustment is not smaller than the predetermined amount.

18. The method according to claim 16, wherein the pair of photoelectric conversion units used for the focus adjustment is a pair of photoelectric conversion units, among a plurality of photoelectric conversion units in each of which an amount of a light beam entering the corresponding light-receiving area is not smaller than a predetermined amount, for which a distance between the pair of photoelectric conversion units is longest.

19. The method according to claim 16, wherein the pair of photoelectric conversion units used for the focus adjustment is a pair of photoelectric conversion units, among a plurality of photoelectric conversion units in each of which an amount of a light beam entering the corresponding light-receiving area is not smaller than a predetermined amount, for which a difference between the amounts of light beams entering the corresponding light-receiving areas is smallest.

20. A control method for an image capture apparatus which comprises an image sensor including an imaging pixel having at least three photoelectric conversion units, comprising the steps of:
displacing an optical axis of a imaging optical system by driving, in a direction different from the optical axis, at least part of the imaging optical system for forming an object image on the image sensor; and
performing focus adjustment by a phase-difference detection method using a pair of images detected in the at least three photoelectric conversion units,
wherein a pair of photoelectric conversion units, among the at least three photoelectric conversion units, to be used for the focus adjustment is switched in the step of performing in accordance with a movement amount of the at least part of the imaging optical system in a direction different from the optical axis in the step of displacing.

* * * * *